United States Patent [19]
Williams

[11] Patent Number: 5,743,671
[45] Date of Patent: Apr. 28, 1998

[54] LATCH FOR COLLAPSIBLE STROLLER

[75] Inventor: Bruce Leslie Williams, Narvon, Pa.

[73] Assignee: Graco Children's Products Inc., Elverson, Pa.

[21] Appl. No.: 740,078

[22] Filed: Oct. 24, 1996

[51] Int. Cl.[6] .................................................. B62B 7/06
[52] U.S. Cl. .............................................. 403/316; 403/99
[58] Field of Search ................................. 403/102, 104, 403/99, 315, 316; 280/642, 650

[56] References Cited

U.S. PATENT DOCUMENTS

| D. 193,626 | 9/1962 | Rech | D15/18 |
|---|---|---|---|
| D. 232,651 | 9/1974 | Fernandez et al. | D40/1 A |
| D. 282,731 | 2/1986 | Kain | D12/133 |
| D. 348,637 | 7/1994 | Globerman et al. | D12/129 |
| D. 357,439 | 4/1995 | Haut et al. | D12/129 |
| D. 362,832 | 10/1995 | Haut et al. | D12/129 |
| D. 363,260 | 10/1995 | Huang | D12/129 |
| D. 375,707 | 11/1996 | Yang | D12/129 |
| 1,488,772 | 4/1924 | Almow | 403/62 X |
| 2,135,487 | 11/1938 | Askue | 403/53 |
| 2,727,753 | 12/1955 | Johnson et al. | 280/47.37 |
| 4,071,920 | 2/1978 | Block | 280/655.1 X |
| 4,415,180 | 11/1983 | Payne, Jr. | 280/650 |
| 4,738,084 | 4/1988 | Ogano et al. | 280/47.36 X |
| 4,856,809 | 8/1989 | Kohus et al. | 280/644 |
| 5,090,724 | 2/1992 | Fiore | 280/643 |
| 5,104,180 | 4/1992 | Takahashi et al. | 297/16 |
| 5,197,753 | 3/1993 | Liu | 280/642 |
| 5,205,577 | 4/1993 | Liu | 280/642 |
| 5,244,228 | 9/1993 | Chiu | 280/642 |
| 5,257,799 | 11/1993 | Cone et al. | 280/642 |
| 5,427,402 | 6/1995 | Huang | 280/642 |
| 5,454,584 | 10/1995 | Haut et al. | 280/642 |
| 5,460,398 | 10/1995 | Huang | 280/642 |
| 5,605,409 | 2/1997 | Haut et al. | 280/642 X |
| 5,622,377 | 4/1997 | Shamie | 280/642 |
| 5,645,293 | 7/1997 | Cheng | 280/642 |

FOREIGN PATENT DOCUMENTS 2603240  3/1988  France ........................... 280/642

OTHER PUBLICATIONS

*Juvenile Merchandising,* Oct. 1992, Cover Page and Over Leaf.

*Primary Examiner*—Anthony Knight
*Attorney, Agent, or Firm*—Richard B. O'Planick

[57] ABSTRACT

A latch for a collapsible stroller includes a primary latch structure and a secondary latch structure which operate differently, thus providing improved safety characteristics. The primary latch structure is locked until the secondary latch structure is actuated. Operation of both the primary latch structure and the secondary latch structure is easily performed with one hand. When setting up the stroller, both the primary latch structure and the secondary latch structure are automatically engaged.

20 Claims, 7 Drawing Sheets

LATCH FOR COLLAPSIBLE STROLLER

BACKGROUND OF THE INVENTION

1. Field of the Invention

The present invention relates to a latch for a collapsible stroller, and more particularly to such a latch with improved characteristics.

2. Discussion of the Related Art

Collapsible strollers have been available for many years to provide convenient transportability. Typically, these strollers include various latch mechanisms to allow them to reliably be maintained in the operational state, and when desired, to reliably collapse. In such strollers, the latch will be locked when the stroller is in an operable state and unlocked to collapse the stroller.

One design is disclosed in U.S. Pat. No. 5,454,584 to Haut et al., the disclosure of which is incorporated by reference herein. Haut et al. discloses a collapsible stroller including a passenger support, a frame, and a pair of latches. In the preferred embodiment of that stroller, the frame is folded at complementary symmetric latches on the right and left sides of the stroller. Furthermore, the latches should be both secure and easily operable during the locking and unlocking process.

However, to provide additional control in locking the collapsible stroller, it may be desirable to provide complementary latches wherein the right and left latches operate differently from each other. Of course, in such a stroller, the simultaneous operation of the differing latches must still be reliable and convenient in such a stroller.

SUMMARY OF THE INVENTION

Accordingly, the present invention is directed to a latch for a collapsible stroller that substantially obviates one or more of the problems due to limitations and disadvantages of the related art.

An object of the present invention is to provide an ergonomic latch which includes a primary latch structure and a secondary latch structure, wherein the secondary latch structure operates differently than the primary latch structure to prevent release of the primary latch structure without first disengaging the secondary latch structure.

Another object of the present invention is to provide a latch wherein the secondary latch structure can be removed therefrom with affecting the operability of the primary latch structure.

A still further object of the present invention is to provide a secondary latch structure which advantageously operates and cooperates with the primary latch structure to allow for ease of use and operation.

Yet another object of the present invention is to provide a latch which can be easily manufactured and assembled at minimal cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the latch for a collapsible stroller adapted to pivotally interconnect a first arm to a second arm includes a primary latch structure including a first member pivotally connected to the first arm, and fixed by a connector to the second arm, and a second member slidably connected to the first arm, and a secondary latch structure disposed on the primary latch structure and adapted to prevent the second member from sliding on the first arm.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
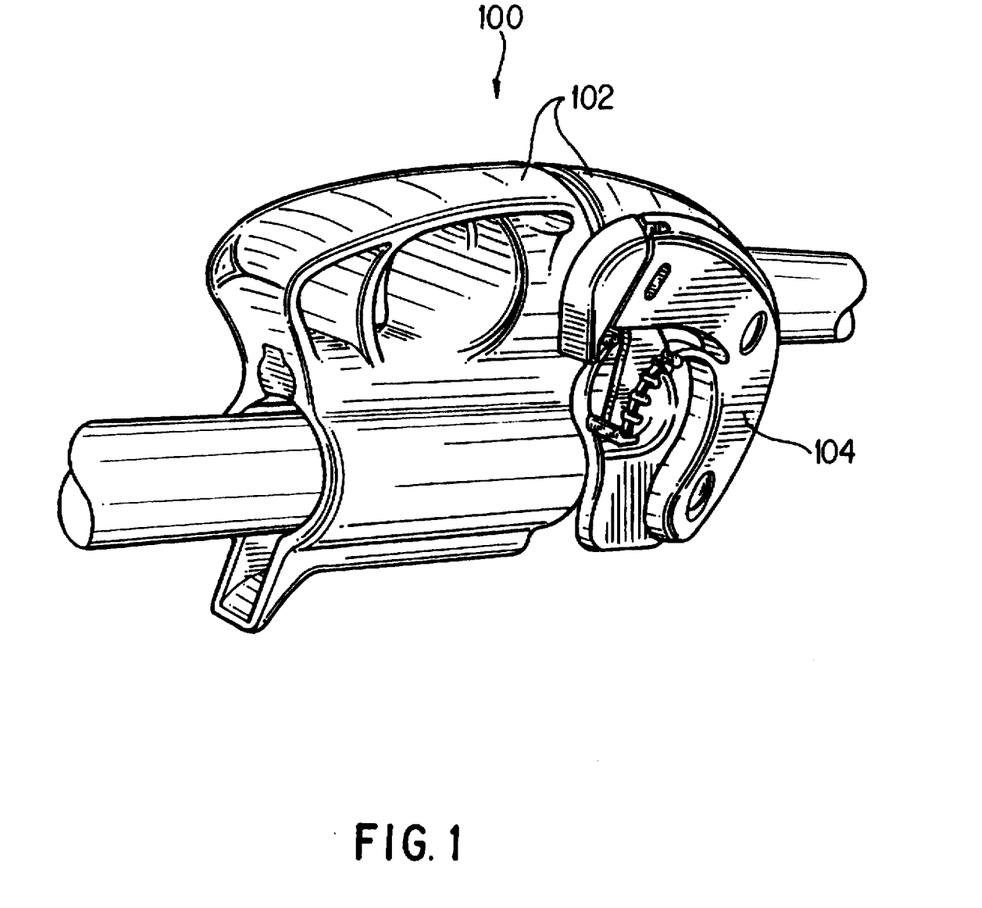
FIG. 1 is a perspective view of a latch for a collapsible stroller in accordance with the present invention in a locked position.
Figure 2:
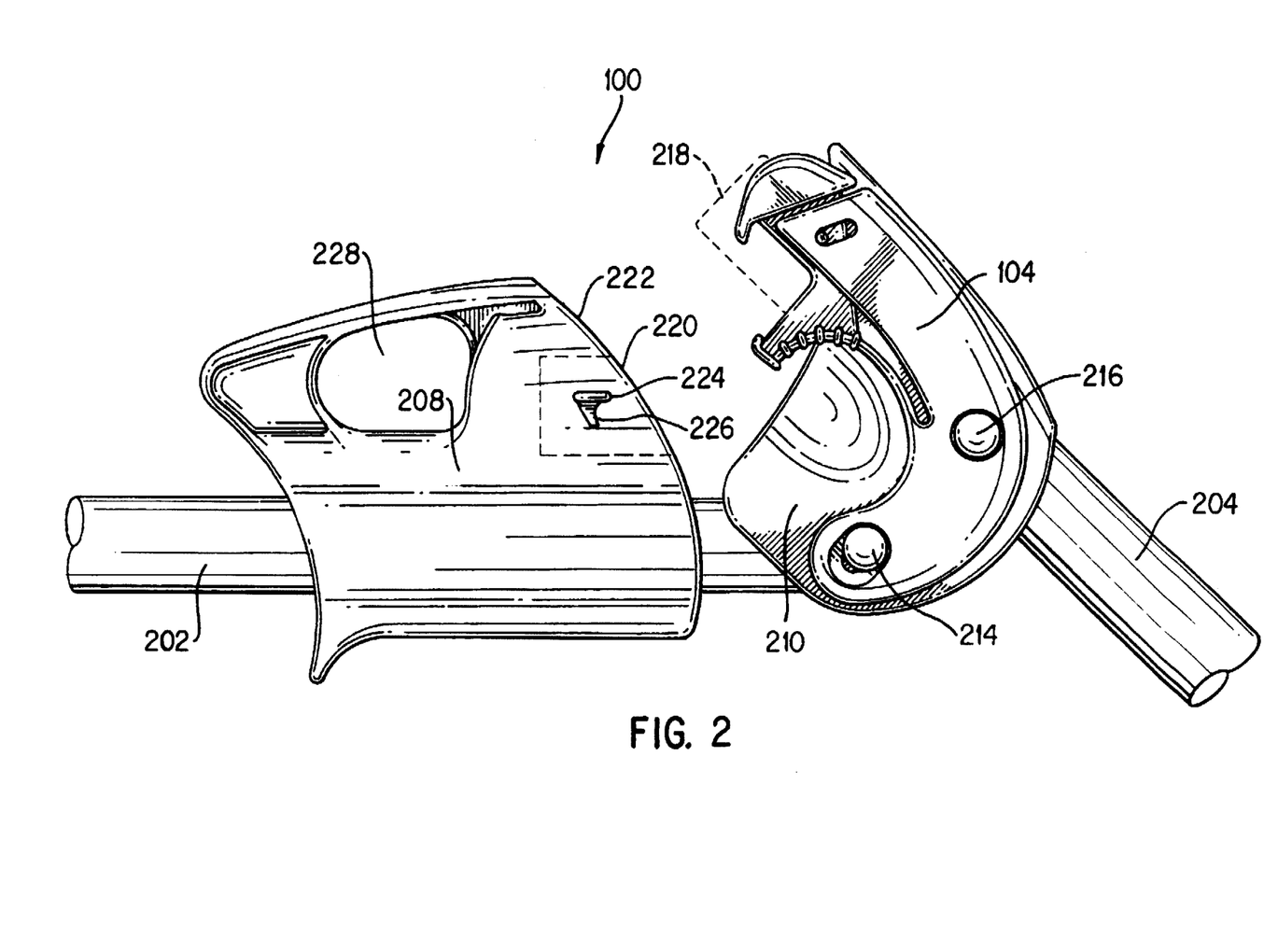
FIG. 2 is a front view of the latch in an unlocked position.

FIGS. 1 and 2 are respectively perspective and front views of the latch for a collapsible stroller in accordance with the present invention.

Referring to FIG. 1, the latch 100 according to the present invention includes a primary latch structure 102 and a secondary latch structure 104. The engagement of the secondary latch structure 104 prevents the release of the primary latch structure 102, thereby providing a secure locking function. As explained in more detail infra, to open the latch, the secondary latch structure 104 must first be actuated, and then the primary latch structure 102 may be operated to fold the stroller.

Referring to FIG. 2, the stroller includes a frame having arms 202 and 204, and a latch 100. In accordance with the preferred embodiment, the latch 100 includes a primary latch structure 102 having a catch 208 slidably mounted on arm 202 and a hinge 210 pivotally mounted on an end of arm 204. The latch 100 further includes a secondary latch structure 104 mounted on the hinge 210.

The arms 202 and 204 are preferably formed of standard materials such as tubular aluminum. However, materials may be used such as plastic or other metals, and the arms may be solid. In addition, the catch 208, the hinge 210, and the secondary latch structure 104 are preferably formed of an injection molded plastic or other comparable material.

As shown in FIG. 2, the hinge 210 is pivotally fastened to an end of arm 202 by pin 214, hereby defining a pivot axis about which the hinge 210 pivots. The hinge 210 is also fixedly attached to arm 204 by pin 216 such that an end 218 of arm 204 protrudes beyond the hinge 210. The pins 214 and 216 are conventional fastening elements such as rivets. However, other fastening elements, such as nuts and bolts, could be used without departing from the spirit and scope of the invention. The pins 214 and 216 further fix the secondary latch structure 104 to the hinge 210.

The catch 208 is slidably mounted on arm 202 and may include a spring (not shown) to bias the catch 208 in the locked position while the catch 208 is not retracted by the user. On the front surface, the catch 208 has an elongate aperture 220 for receiving the end 218 of the arm 204, and a sloped cam surface 222 adjacent to the aperture 220 for guiding the end 218 of arm 204 into the aperture 220. On the side, the catch 208 includes a projection 224 for engaging the secondary latch structure 104. The projection 224 has a generally planar shape and is further supported by a rib support 226. Finger indent 228 assists the user in retracting the catch from the locked position to the unlocked position, as will be described.

Figure 5:
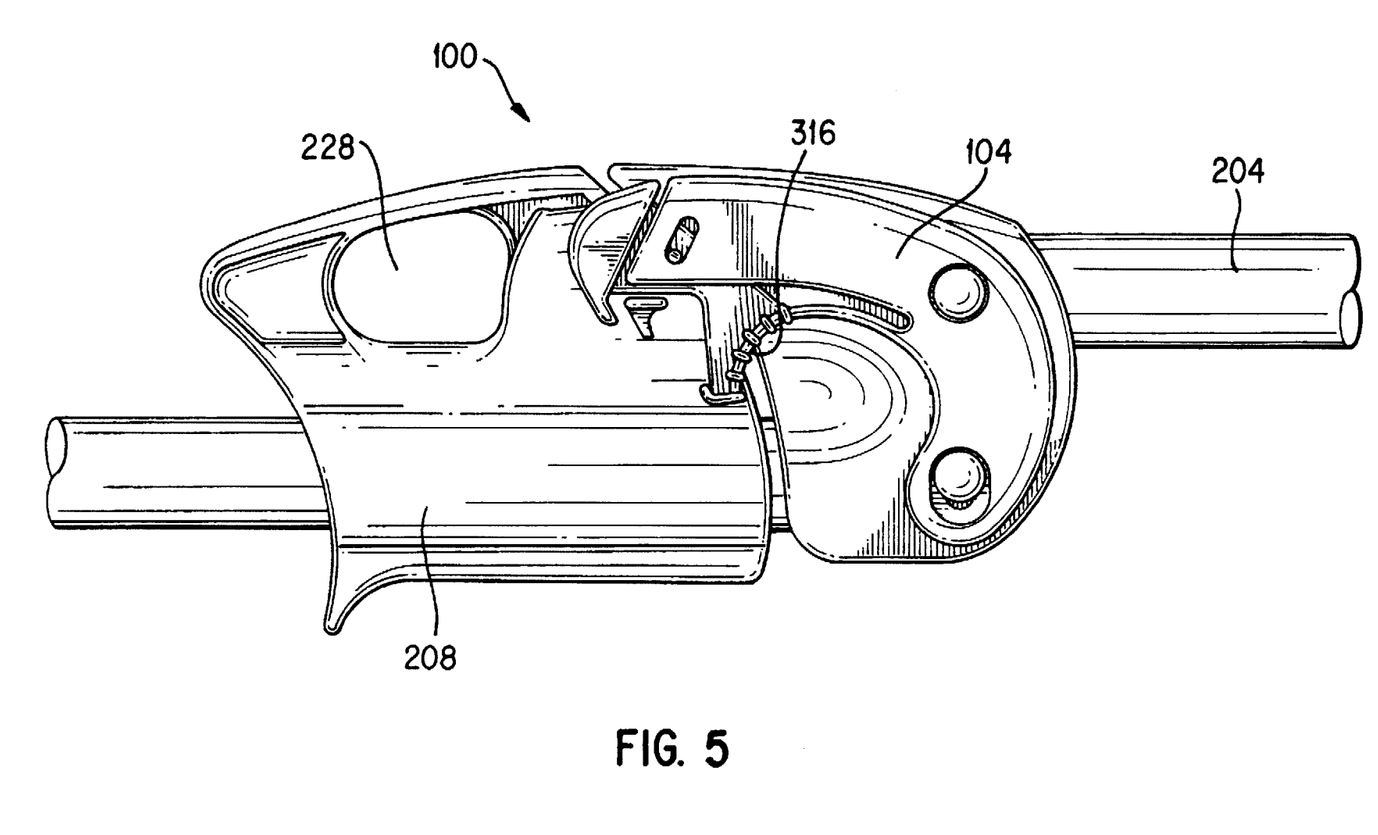
FIG. 5 is a front view of the latch in a locked position.
Figure 7:
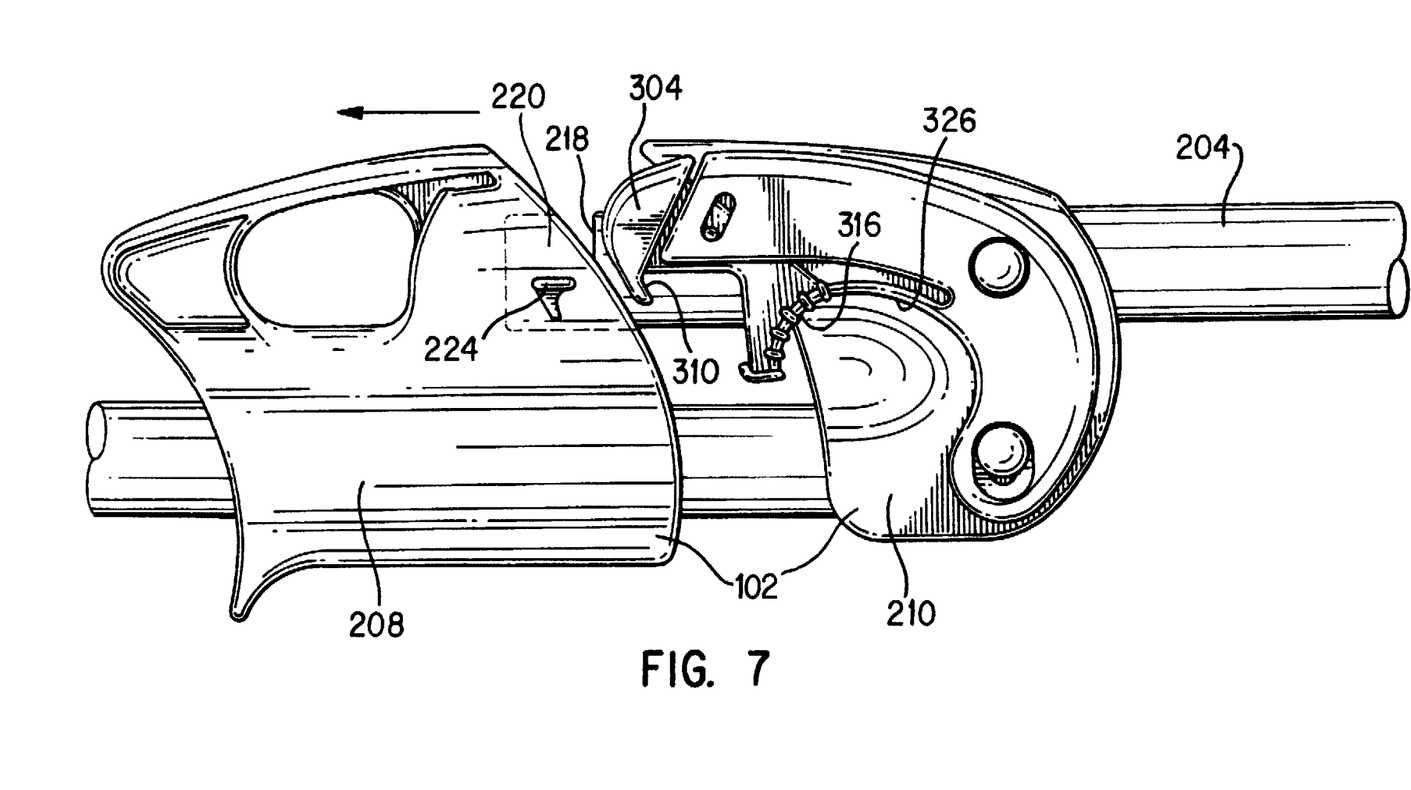
FIG. 7 is a front view of the latch with the slidable catch retracted.

In the preferred embodiment, the catch 208 is slidable between a locked position, as shown in FIG. 5, and an unlocked position, as shown in FIG. 7. In the locked position, the catch 208 is adjacent to the hinge 210, whereas, in the unlocked position, the catch 208 is retracted away from the hinge 210.

Figure 3:
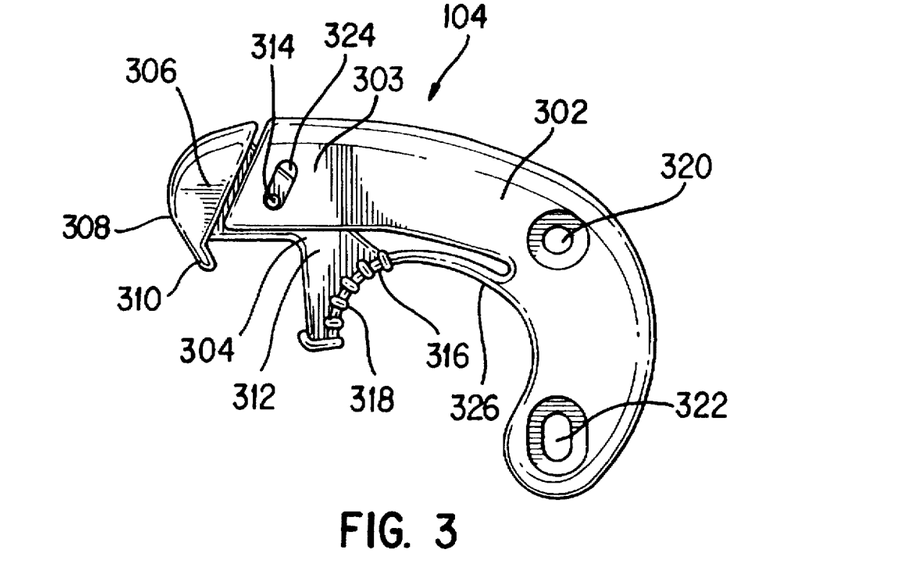
FIG. 3 is a front view of the secondary latch structure in an assembled position.
Figure 4:
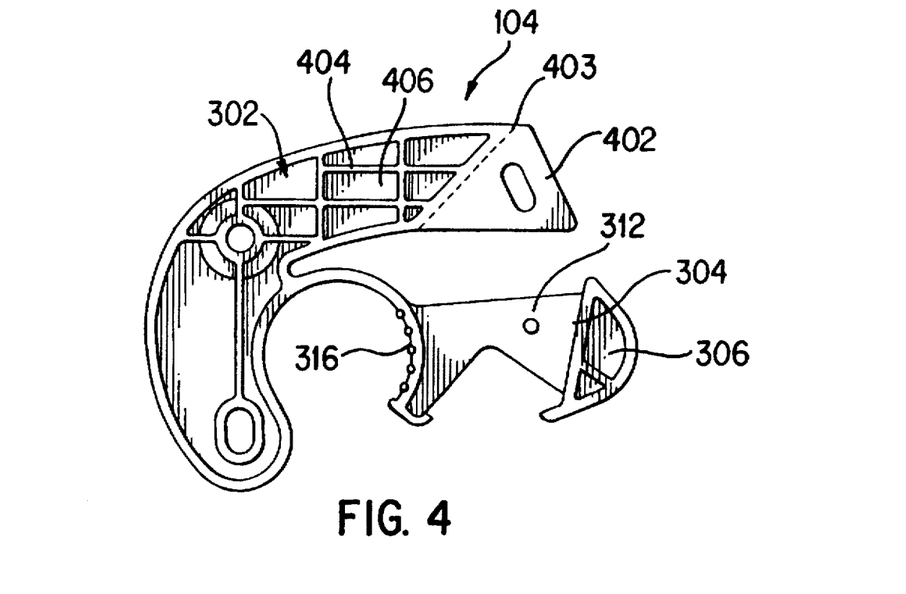
FIG. 4 is a rear view of the secondary latch structure in an unassembled position.

FIG. 3 shows a front view of the secondary latch structure 104 in an assembled position, and FIG. 4 shows a rear view of the secondary latch structure 104 an unassembled position. The secondary latch structure will now be described with reference to FIGS. 3 and 4.

As shown in FIG. 3, the secondary latch structure includes a body 302 having a front wall 303 and an engagement portion 304. The engagement portion 304 includes a head portion 306 having a sloped surface 308 and an engagement extension 310, a connecting portion 312 with a projection 314, and an actuation trigger 316 with a plurality finger ribs 318. The finger ribs 318 assist the user in positively actuating the secondary latch structure 104. The body 302 includes recessed pin holes 320 and 322 for receiving rivets and a slot 324 for receiving and guiding the projection 314. Rivet hole 322 may be elongated to allow interchangeable usage with a range of similar but dimensionally different primary latches. In the preferred embodiment, the secondary latch structure 104 further includes a spring 326. Although the spring may be a separate component, the use of an integral plastic spring 326 provides low cost and high reliability. Furthermore, as shown in FIG. 2, the spring is protected and guided by the body of the hinge 210, thereby providing damage resistance.

FIG. 4 shows a rear view of body 302 of the secondary latch structure 104. Here, a cavity defined by a front wall 303 and a rear wall 402 in the body 302. The dashed line 403 in FIG. 4 indicates the extent of the cavity. In the preferred embodiment, the secondary latch structure 104 is formed in the unassembled position. After forming the secondary latch structure 104, the engagement portion 304 is inserted into the cavity 402 such that the projection 314 fits into the slot 324. Preferably, the surface of the projection is sloped to ease the insertion into the slot. The sloped surface allows the front wall 303 and the rear wall 402 to gradually flex during insertion. In such a position, the engagement portion 304 is movable between a lower (locked) position and an upper (unlocked) position. Moreover, the spring portion 326 maintains the engagement portion 304 in the lower position. For enhanced stability during operation, the body has slots 324 on the front and rear sides, and the engagement portion has projections 314 on the front and rear side. To reduce material usage while maintaining strength, the secondary latch structure 104 can be formed having ribs 404 and cavities 406.

The operation of the latch 100 for a collapsible stroller, as described above, will now be described with reference to FIGS. 5 to 8. FIG. 5 shows the latch 100 in a locked position. Here, the end 218 of the arm 204 is seated and locked into the aperture 220 of the catch 208. To unlock the latch, a user must first release the secondary latch structure 104. A user may preferably grasp the latch 100 with the index finger on the trigger 316, and the middle finger or thumb in the finger indent 228. Alternatively, rather than using the finger indent 228, the user may grasp the body of the catch 208 with the hand while the index finger is on the trigger 316.

Figure 6:
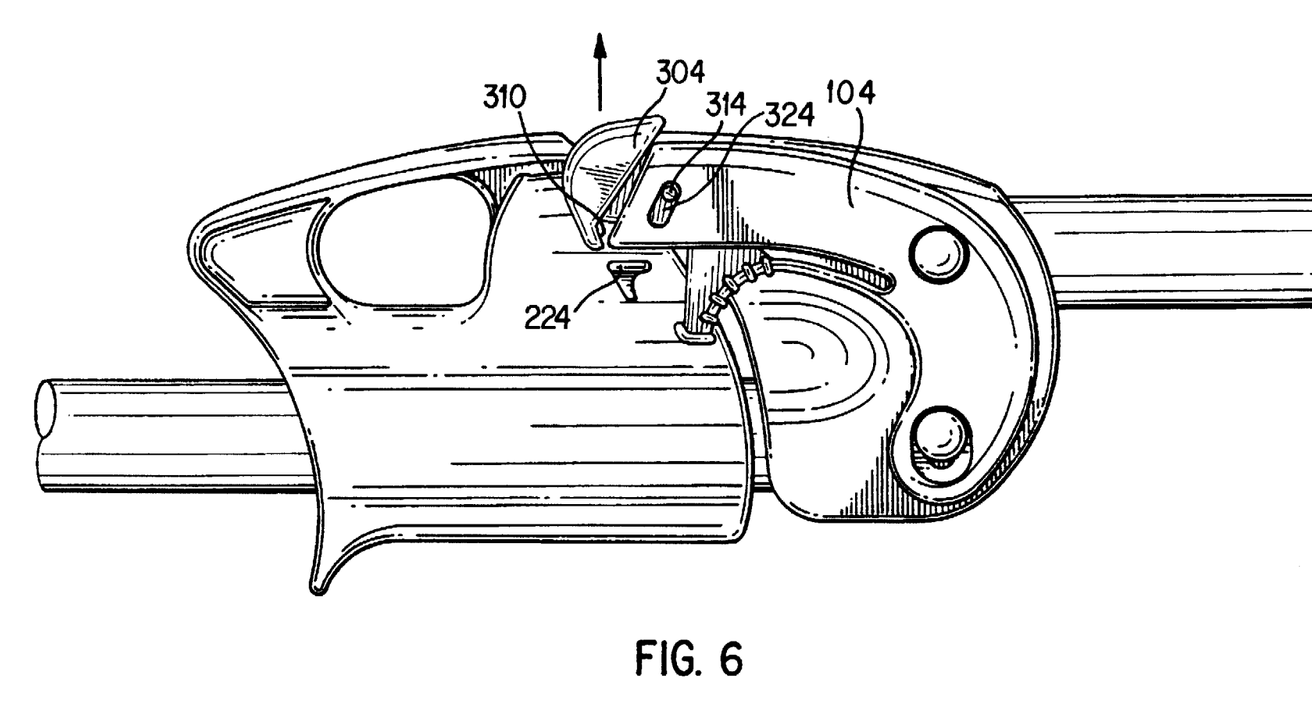
FIG. 6 is a front view of the latch with the secondary latch structure actuated.

Next, as shown in FIG. 6, the secondary latch structure 104 is shown in a released configuration. Preferably, the secondary latch structure may be actuated by pulling on the trigger 316 with the index finger, thereby moving the engagement portion 304 to the unlocked position. During this motion, the groove 324 and the projection 314 will guide and limit the motion of the engagement portion 304. Also, the engagement extension 310 will no longer be engaged with the projection 224, and the secondary latch structure 104 is disengaged.

As shown in FIG. 7, the catch 208 is slid back away from the hinge 210, thereby removing the end 218 of the arm 204 from the aperture 220 to disengage the primary latch structure 102. When the trigger 316 is released, the bias of the spring portion 326 will return the engagement portion 304 to the lower position. Here, the secondary latch structure will not be engaged (locked) because the projection 224 has been retracted and cannot be engaged by the engagement extension 310. While retracting the catch 208, the user slides the catch against the force of a spring (not shown). The spring biases the catch in the locked position to prevent inadvertent unlocking of the latch 100 and to retain the latch 100 in the locked position until the catch 208 is retracted by the user. If the user attempts to retract the catch 208 before actuating the secondary latch structure 104, the catch 208 will be retained by the engagement of the engagement tooth 310 with the projection 224, thereby preventing the latch from opening.

Figure 8:
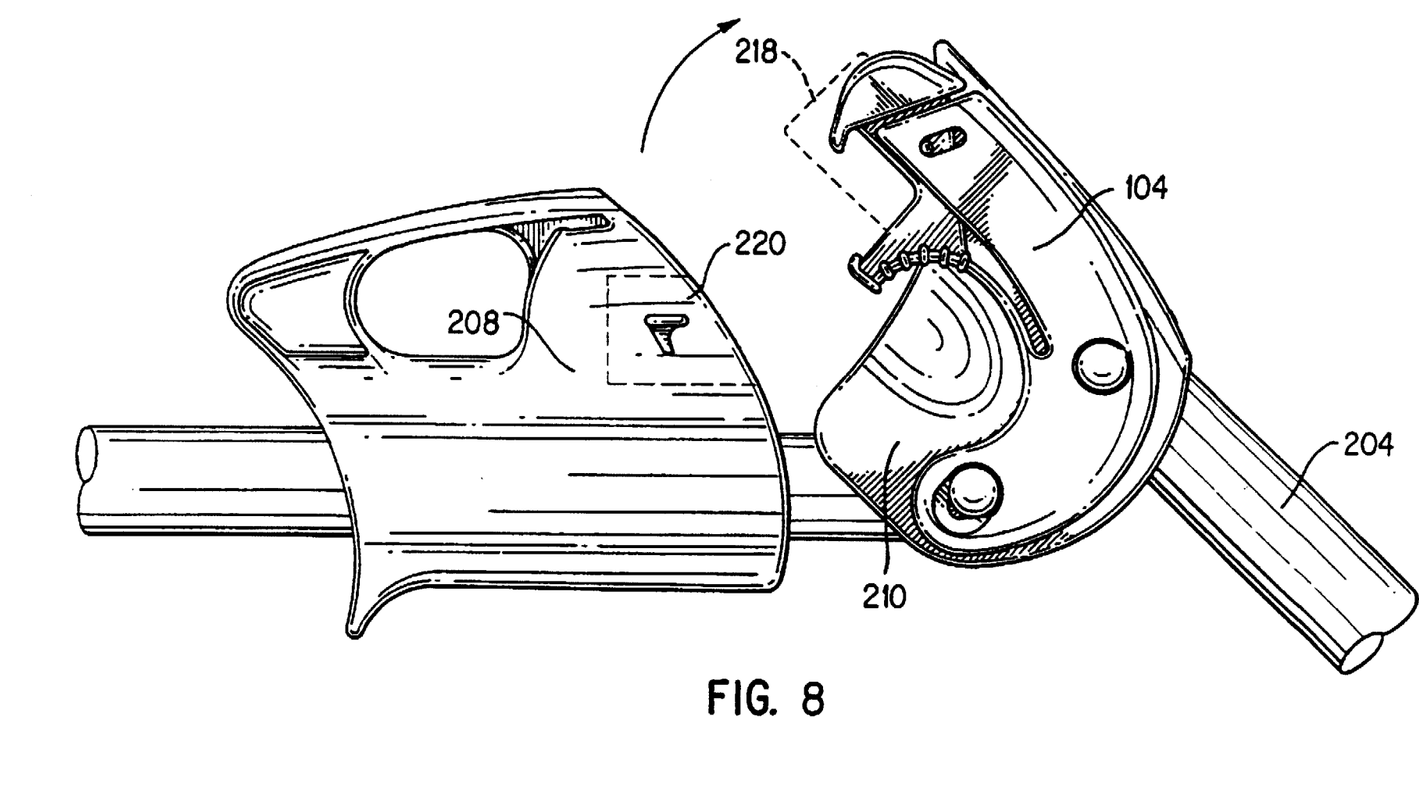
FIG. 8 is a front view of the latch in an unlocked position.

As shown in FIG. 8, the frame of the stroller is now able to be folded by rotating the hinge 210. When the catch 208 is released by the user, the catch 208 returns to the locked position but the end 218 of the arm 204 is not seated in the aperture 220. Therefore, the latch 100 is not locked. Furthermore, the operation of the latch 100, as described, provides positive latching for reliable service, and easy operation with one hand.

To lock the latch 100 for a collapsible stroller, the user rotates the hinge 210 such that the arms 202 and 204 are parallel to each other. In doing such, the cam surface 220 of the catch 208 causes the catch 208 to slide to the open position and guides the end 218 of the arm 204 into the aperture 220. As the catch 208 accepts the end 218 and slides to its locked position, the sloped surface 308 of the head 306 contacts the engagement portion 304 to allow the engagement tooth 310 to slide up and over the projection 224, thereby locking the secondary latch structure. As a result, the primary latch structure 102 and the secondary 104 latch may be engaged automatically upon setting up the stroller.

The latch having the secondary latch structure as described can be used for either the right or left latch of the stroller. As will be appreciated, the one secondary latch structure prevents disengagement of both the right and left primary latch structures unless proper activation is completed.

The latch in accordance with the present invention provides ergonomic and intuitive operation, thereby minimizing the annoyance of additional latching devices. Furthermore, the latch as described can be applied to current strollers with minimal modification in design. However, the latch maintains an aesthetically pleasing appearance and blends with the stroller to avoid an add-on look.

It will be apparent to those skilled in the art that various modifications and variations can be made in the hinge for a collapsible stroller of the present invention without departing from the spirit or scope of the invention. Thus, it is intended that the present invention cover the modifications and variations of this inventions provided they come within the scope of the appended claims and their equivalents.

I claim:

1. A latch for a collapsible stroller adapted to pivotally interconnect a first arm to a second arm, comprising:

a primary latch structure including a first member pivotally connected to the first arm, and fixed by a connector to the second arm, and a second member slidably connected to the first arm, said second member having an engaged position securing said first member and a disengaged position releasing said first member; and a secondary latch structure disposed on the primary latch structure and adapted to prevent the second member from sliding on the first arm, such that said secondary latch structure releasably locks said first latch.

2. The latch according to claim 1, wherein the secondary latch structure is disposed on the first member.

3. The latch according to claim 1, wherein the second member includes a projection to which the secondary latch engages.

4. The latch according to claim 3, wherein the projection is substantially planar shaped.

5. The latch according to claim 4, wherein the projection includes a support rib.

6. The latch according to claim 1, further comprising a first and second fasteners for fastening the second member to the first and second arm, respectively.

7. The latch according to claim 6, wherein first and second fasteners fasten the secondary latch structure to the primary latch structure.

8. The latch according to claim 1, wherein the secondary latch structure includes:

a body portion fixedly disposed on the first member; and an engagement portion movable with respect to the body portion between first and second positions.

9. The latch according to claim 8, wherein the body defines a slot, and wherein engagement portion has a head portion, an engagement extension extending from the head portion, and a projection slidable within the slot.

10. The latch according to claim 8, wherein the secondary latch structure further includes a spring portion for restoring the engagement portion to the first position after the engagement portion is moved to the second position.

11. The latch according to claim 8, wherein the engagement portion has a trigger portion for moving the engagement portion from the first position to the second position.

12. The latch according to claim 11, wherein the trigger includes finger ribs.

13. The latch according to claim 1, wherein an end of the second arm protrudes from the first member and the second member is adapted to receive the end of the second arm.

14. The latch according to claim 13, wherein the second member has an elongated aperture for receiving an end of the second arm.

15. The latch according to claim 14, wherein the second member includes a sloped surface disposed adjacent to the elongate aperture for guiding the end of the second arm into the elongated aperture.

16. The latch according to claim 1, wherein the second member includes a finger indent for grasping and pulling the catch when sliding the catch.

17. The latch according to claim 1, wherein primary latch structure further includes a spring member for biasing the first member in a locked position.

18. A latch for a collapsible stroller adapted to pivotally interconnect a first arm to a second arm, said latch comprising:

a primary latch structure including a first member pivotally connected to the first arm, and fixed by a connector to the second arm, and a second member slidably connected to the first arm; and a secondary latch structure disposed on the primary latch structure and adapted to prevent the second member from sliding on the first arm, said secondary latch structure comprises a body portion fixedly disposed on the first member and an engagement portion movable with respect to the body portion between first and second positions, said engagement portion having a head portion an engagement extension extending from the head portion and a projection slidable within the slot, the head has a sloped portion.

19. A latch according to claim 18, wherein the body defines a cavity, and wherein the engagement portion is disposed slidably within the cavity.

20. A latch for a collapsible stroller adapted to pivotally interconnect a first arm to a second arm, said latch comprising:

a primary latch structure including a first member pivotally connected to the first arm; and fixed by a connector to the second arm, and a second member slidably connected to the first arm; and a secondary latch structure disposed on the primary latch structure and adapted to prevent the second member from sliding on the first arm, said secondary latch structure comprises a body portion fixedly disposed on the first member and an engagement portion movable with respect to the body portion between first and second positions, said engagement portion having a head portion an engagement extension extending from the head portion and a projection slidable within the slot, said secondary latch structure further including a spring portion for restoring the engagement portion to the first position after the engagement portion is moved to the second position the body portion, the spring portion and the engagement portion are integral.

* * * * *